(12) United States Patent
Witt-ehsani et al.

(10) Patent No.: US 8,787,534 B1
(45) Date of Patent: Jul. 22, 2014

(54) METHOD AND APPARATUS OF PROCESSING SPEECH DIALOG DATA OF A USER CALL

(75) Inventors: Silke Witt-ehsani, Sunnyvale, CA (US); Aaron Scott Fisher, Omaha, NE (US)

(73) Assignee: West Corporation, Omaha, NE (US)

( * ) Notice: Subject to any disclaimer, the term of this patent is extended or adjusted under 35 U.S.C. 154(b) by 145 days.

(21) Appl. No.: 13/185,095

(22) Filed: Jul. 18, 2011

Related U.S. Application Data

(60) Provisional application No. 61/492,681, filed on Jun. 2, 2011.

(51) Int. Cl.
 *H04M 1/64* (2006.01)
(52) U.S. Cl.
 USPC ................... 379/88.01; 379/265.01
(58) Field of Classification Search
 USPC ............. 379/88.01, 265.01–266.03; 704/252, 704/275
 See application file for complete search history.

(56) References Cited

U.S. PATENT DOCUMENTS

| 7,657,433 B1 * | 2/2010 | Chang ........................... 704/252 |
| 2003/0191648 A1 * | 10/2003 | Knott et al. ................... 704/275 |

\* cited by examiner

*Primary Examiner* — Fan Tsang
*Assistant Examiner* — Van D Huynh

(57) ABSTRACT

A method and apparatus of processing caller experiences is disclosed. One example method may include determining a call event type occurring during a call and assigning a weight to the call event type via a processing device. The method may also include calculating a caller experience metric value representing a caller's current call status responsive to determining the at least one call event type, the caller experience metric being a function of the current event type weight and a discounting variable that discounts a value of past events. The method may also provide comparing the caller experience metric to a predefined threshold value and determining whether to perform at least one of transferring the call to a live agent and switching from a current caller modality to a different caller modality.

20 Claims, 8 Drawing Sheets

| Parameter Name | Estimated value |
|---|---|
| $S_{Dir}$ | 1.46 |
| $S_A$ | 0.66 |
| $S_{Rel}$ | 1.00 |
| $S_{Sum}$ | -0.46 |
| $S_{TO}$ | 0.80 |
| $T$ | 2.27 |

FIG. 3

| Parameter set # | $S_{key}$ | $S_{TD}$ | $S_a$ | $S_{dia}$ | $S_{duc}$ | κ | % Agreement between human and machine | σ variance by one between human and machine | % total agreement up to a difference of 1 between human and machine |
|---|---|---|---|---|---|---|---|---|---|
| 1 (orig estimate) | 1 | 0.8 | 0.6 | 1.5 | -0.5 | 0.670 | 64 | 28 | 92 |
| 2 (max kappa combination) | 0.9 | 1 | 0.6 | 1.5 | -0.2 | 0.733 | 76.6 | 16.7 | 93.3 |
| 3 (example of low correlation parameter set) | 1.1 | 1 | 0.6 | 1.5 | -0.2 | 0.699 | 62 | 27.7 | 89.7 |
| 4 (example max overall agreement) | 0.9 | 1 | 0.4 | 1.5 | -0.2 | 0.719 | 70 | 24.4 | 94.4 |

|  | % Calls ending in Max Error | AVG. # Error/Call | AVG. CEM |
|---|---|---|---|
| Without CEM | 3% | 2.7 | 0.90 |
| With CEM | 1% | 1.6 | 0.94 |

FIG. 5A

| Application Type | Initial Release | After Parameter adjustment | Relative Improvement |
|---|---|---|---|
| Stop | 57.40% | 63.87% | 11.27% |
| Start | 5.70% | 8.23% | 44.39% |
| Transfer | 10.10% | 13.39% | 32.57% |

FIG. 5B

METHOD AND APPARATUS OF PROCESSING SPEECH DIALOG DATA OF A USER CALL

CROSS REFERENCE TO RELATED APPLICATIONS

This application claims benefit to provisional application No. 61/492,681, entitled "Caller experience metric for dialog management and performance monitoring", filed on Jun. 2, 2011, the entire contents of which are hereby incorporated by reference.

TECHNICAL FIELD OF THE INVENTION

This invention relates to a method and apparatus of processing user input speech, and in particular, to processing speech dialog to determine the subsequent call flow operations and to score the user's overall call experience.

BACKGROUND OF THE INVENTION

Generally, in commercial user speech dialog systems, two of the main hurdles in terms of cost efficiency are the need to customize every interaction with the call processing system, and the need to provide a single call processing system that can accommodate the different types of users. For example, users could be novices or experienced, cooperative or distracted, and/or could be calling from a quiet environment versus a noisy environment, etc.

The varying needs that the users' require from the call system create problems for at least a percentage of the callers. No matter how well designed and fine-tuned a spoken dialog system is setup to perform, there will always be a percentage of callers that will have difficulties interacting with the call system and its corresponding automated features, and thus will be unsatisfied with the call experience. Generally, in dialog-based systems that automate call center functionality, the balance between automation rate and caller satisfaction is controlled by rules that determine when to transfer a call to a call center agent.

One common rule of thumb is after three consecutive errors detected in one dialog state or session, the caller is automatically transferred to a live agent. However, this approach has the drawback and disadvantage of not taking into account the caller experience up to the point of the dialog state where the errors begin happening. This default rule of thumb transfer rule does not take into account any other feature or event except for the specific error type that is occurring. In other words, the transfer decision is based on a single feature as opposed to utilizing multiple features for the decision making.

There have been several previous approaches to measure caller experience and/or to predict problematic calls. For example, the information of the first two to four dialog turns may be used to predict if a caller will experience difficulties later on, but this method does not apply to every possible dialog in a call processing system. In another example, the caller experience is automatically calculated for an entire call. However, the calculation is derived from application logs after a call is completed. In yet another example, a method is used to calculate, at each turn in the call processing system, whether the cost of transferring is less than the cost of keeping the caller in the system. These previous solutions to handling user calls are each limited in their capability to provide caller assistance and caller satisfaction.

SUMMARY OF THE INVENTION

One embodiment of the present invention may include a method that includes determining a call event type occurring during a call and assigning a weight to the call event type via a processing device. The method may also include calculating a caller experience metric value representing a caller's current call status responsive to determining the least one call event type, the caller experience metric being a function of the current event type weight and a discounting variable that discounts a value of past events. The method may also provide comparing the caller experience metric to a predefined threshold value and determining whether to perform at least one of transferring the call to a live agent and switching from a current caller modality to a different caller modality.

Another example embodiment may provide an apparatus that includes a transmitter and a processor. The processor may be configured to determine a call event type occurring during a call and assign a weight to the call event type. The processor may also be configured to calculate a caller experience metric value representing a caller's current call status responsive to determining the at least one call event type. The caller experience metric is a function of the current event type weight and a discounting variable that discounts a value of past events. The processor may also be configured to compare the caller experience metric to a predefined threshold value and determine whether to perform at least one of transfer the call, via the transmitter, to a live agent and switch from a current caller modality to a different caller modality.

BRIEF DESCRIPTION OF THE DRAWINGS

FIG. 3 illustrates a parameter estimation table according to example embodiments of the present invention.

FIG. 4 illustrates an example human and machine parameter estimation table according to example embodiments of the present invention.

FIGS. 5A and 5B illustrate call processing system result tables according to example embodiments of the present invention.

DETAILED DESCRIPTION OF THE INVENTION

Figure 1A:
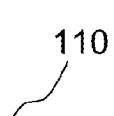
FIGS. 1A and 1B illustrate example event sequence tables according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", Or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

According to example embodiments of the present invention, a metric is calculated at each dialog turn taken by the user during the course of a user call. A call transfer decision as to whether the user call should be transferred to a call agent is based on a threshold value that is aimed at the user's overall call experience rather than just a simple cost calculation. This threshold value can be adjusted at runtime depending on the needs of the call center agency or client.

The calculated metric may be use to automatically track the experience of the caller in the spoken dialog system up to the current moment in time. This metric can be used by the dialog manager to adapt a call flow, and can be used to automatically score the caller experience for each call. The parameters used to calculate the metric value may be estimated in order to maximize the correlation of automatic scores calculated with human ratings. Furthermore, this metric may be used to determine caller satisfaction and related application success.

An automatic scoring metric is used to replace or at least reduce the need to have a person score entire call recordings to identify a system's overall performance or in order to identify problematic calls. In order to compare the performance of the automatic scoring procedure described in this disclosure, a human score rater conducted a test by scoring 100 calls for a cable television company call application on a scale of 1 to 5, with 1 being the most positive caller experience and 5 being the worst caller experience. The human score rater was experienced in rating call recordings of this nature and also received detailed rating instructions.

The agreement between two different score raters, in this example, between a human score rater and an automatic score rater, can be measured with Cohen's correlation metric variable kappa ($\kappa$). This correlation metric ($\kappa$) factors in the possible agreement between two score raters due to a chance function $P(e)$. Let the function $P(a)$ be the relative observed agreement between two raters.

Then ($\kappa$) is defined as:

$$\kappa = P(a) - P(e)/(1-P(e)).$$

Since the ratings in this case are on an ordinal scale, a linearly weighted ($\kappa$) is used to take into account the fact that the difference between two adjacent ratings is smaller than the difference between two ratings further apart.

Past experiments showed a correlation in the ratings between human raters and also between the automated metric and the human rater. As a result, it was determined that a) ratings by human judges will correlate assuming that the raters have been given reliable scoring instructions and b) that it is possible to have automated metrics that can correlate with human ratings. The call related metric described in this disclosure generates automated scores for calls correlated with human ratings.

The most common events conducted during a call with a spoken dialog system may include a successful turn where the call system successfully recognized and also confirmed the caller's spoken utterance. Or a rejection error where the recognizer could not understand the caller's spoken utterance with sufficient confidence and the utterance was rejected. Other events may include a timeout error where the call system did not detect any caller speech during a predefined time period, (i.e., typically around 5 seconds). Another event is a disconfirmation where the caller disconfirmed the recognition result of the call system. Another example is an agent request where the caller requested to speak with a call center agent, this can typically be interpreted as a sign that the caller does not want to use the automated call system.

Figure 1B:

In order to obtain an understanding of the event types that contribute to a negative or positive caller experience, statistics may be gathered from data logs that are created based on the call recordings that had been rated by the expert score rater. FIG. 1A illustrates a table that lists the most common event sequences that were found to be associated with calls that had a negative experience rating of either 4 or 5. Additionally, FIG. 1B illustrates a table for calls with positive call experiences. For these experimental calls, the relationship between the human ratings and the common event sequences were extracted from the application logs of a deployed application for a cable company.

From the event sequences in FIG. 1A, it can be seen that typically there are at least two negative events such as a "rejection error" and a "disconfirm", but these events are not necessarily sequential. For example, this approach also produced event sequences such as alternative turns of "rejection error" and "successful turn", which would not be considered two sequential negative events. Moreover, the event sequence is not limited to a single dialog state, rather it spans several states. In contrast, event patterns for calls with a positive caller experience predominantly have successful turns.

Ideally, those callers who are likely to be frustrated and unlikely to be successful in completing their goals are the ones that should be transferred to an agent. On the other hand, callers who might have had occasional voice recognition or turn-taking errors but otherwise are making progress should be kept in the system if at all possible. This can be modeled with a "caller experience metric" (CEM), which represents the entirety of a caller's interaction with a system as opposed to the interaction at a dialog state level. One can define caller experience metrics based on recognition successes and failures that have a high correlation of a how human expert would rate the experience of a caller.

Figure 2:
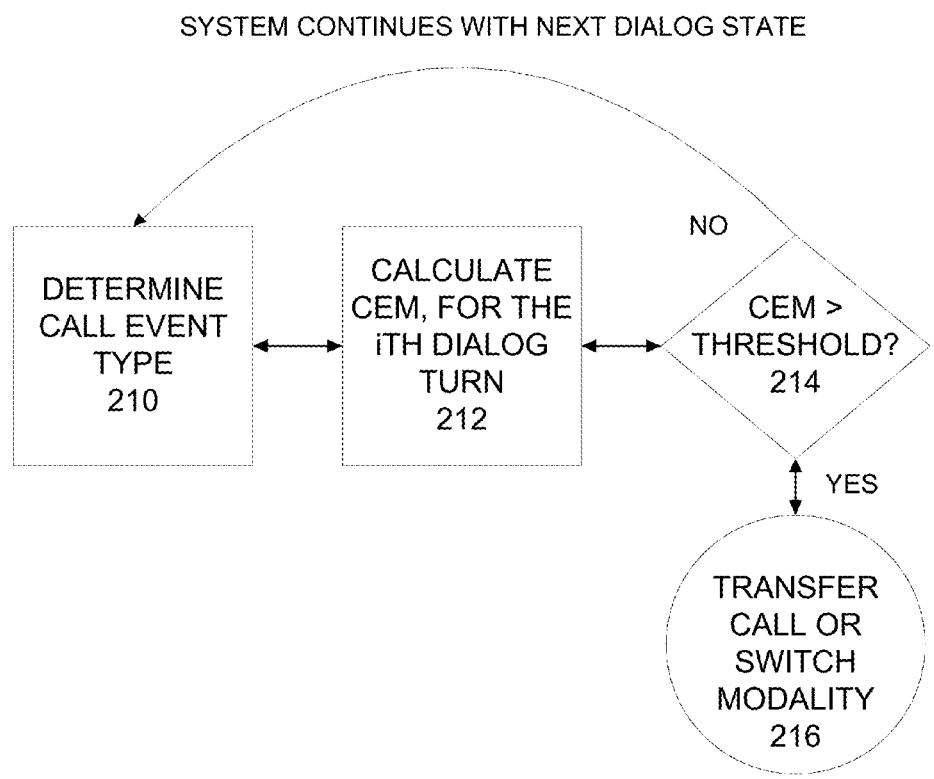
FIG. 2 illustrates an example flow diagram according to example embodiments of the present invention.

FIG. 2 illustrates an example flow diagram that calculates the caller experience metric (CEM) value at each dialog turn. Referring to FIG. 2, the dialog manager architecture is illustrated to include the calculation of the caller experience metric (CEM), which is designed to capture and integrate all caller experience related events, such as successful recognition results, disconfirmations, agent requests and/or rejection errors. At every turn in a caller's spoken dialog, the value of the CEM metric can be used as one of the decision criteria used by the dialog manager to determine which action to perform. Possible actions are to "transfer" (i.e., to a live agent), "switch modality" (i.e., switch from voice commands to dual tone multi-frequency (DTMF), to reduce the prompt read-back speed and so forth), etc.

Initially, a call event type must be determined at operation 210. Next, a CEM value is calculated for the ith dialog turn at operation 212. A CEM value may be calculated after every dialog turn taken by the caller. Examples of dialog turns may include providing a solicited response to an automated voice call system (i.e., "what is your name?", "please say or enter your account number", etc.). Once a new CEM value is calculated at operation 214 it must be compared to a predetermined threshold value to determine if it is greater than or less than the predetermined threshold value. If so, an action is performed to transfer the call or switch a current modality at operation 216. If not, the procedure is performed again at the next dialog turn to calculate a new CEM value.

The CEM metric may be used to automatically assign a caller satisfaction score to each call at the end of each call "call end." The spoken dialog call processing system performance may be increased by using such metrics to aid the dialog manager's decision on the next turn in the call. In order to define the CEM, let S be a set of weights for all event types or set-back features that are taken into account for this call experience metric. Such events might represent any number of events that describe the caller experience at a given dialog state and are available at runtime.

The naming for possible setback events $S_k$ may include rejection error ($S_{Rej}$), disconfirmation ($S_{Dis}$), timeout error ($S_{TO}$), agent request ($S_A$), and successful recognition event ($S_{Succ}$). At each dialog turn i, the experience metric is calculated as: $CEM(i) = d \cdot CEM(i-1) + S_i$. $S_i$ denotes the weight for the current event and d is a discounting variable to weight events further in the past as less important. Thus, if a caller had a couple errors followed by several successful recognition steps, the errors further in the past have less impact on the present.

The caller experience metric (CEM) may enable dialog management by providing a metric to aid the decision when to transfer to a live agent. The CEM may also provide an automated score at the end of a call. In order to use the CEM as a dialog management mechanism, a user can define a number of rules describing which kind of event sequences would maintain a call in the application or its current modality. Also, a number of rules may also be defined that describe event sequences that dictate when a call should be transferred or receive some other form of special treatment. A dialog turn may be any spoken utterance performed by the caller and interpreted by the call processing system.

The information in the tables 110 and 120 of FIGS. 1A and 1B, respectively, can be used to select several dialog scenarios after which the CEM score should be above the predefined threshold for sequences from table 110, or below the threshold for sequences from table 120. Six example conditions are described below. Three conditions represent negative event sequences after which a call should pass the threshold. Three conditions represent positive or acceptable event sequences which should yield a CEM score just below the threshold, (i.e. a call should continue in its current mode).

A call with only successful occurrences would always score well below the threshold value. Estimating a set of event type weights may be used to yield a global score just below the threshold value for the acceptable sequences and a score above the threshold value for negative event sequences. Example "negative" and example "acceptable" event sequences can be found in the tables 110 and 120 of FIGS. 1A and 1B, respectively.

The example event sequences may be (1) above the threshold value after 2 "disconfirms", (2) above the threshold value after 1 "disconfirm", 1 "agent request" and 1 "rejection error", (3) above the threshold value after 2 "rejections", 1 "successful turn", another "rejection" and then 1 "timeout", (4) below threshold for 1 "timeout", 1 "successful turn", 1 "rejection" and an "agent request", (5) below threshold value for 1 "disconfirmation", 1 "successful turn", 1 "timeout", and (6) below threshold for 1 "successful turn", 1 "rejection", 1 "timeout", 1 "successful turn" and 1 "timeout."

Let T be the CEM threshold. Then, the CEM score after the completion of the above-noted event sequences can be calculated by recursively plugging all events into the CEM formula. Performing this for the 6 above-noted example sequences yields the following set of inequalities:

$$(1+d)S_{Dis}^2 > T \qquad \text{I.}$$

$$d^2 S_{Dis} + d S_A + S_{Rej} > T \qquad \text{II.}$$

$$(d^4 + d^2 + d)S_{Rej} + d^2 S_{Succ} + S_{TO} > T \qquad \text{III.}$$

$$d^2 S_{TO} + d^2 S_{Succ} + d S_{Rej} + S_A < T \qquad \text{IV.}$$

$$d^2 S_{Dis} + d S_{Succ} + S_{TO} < T \qquad \text{V.}$$

$$(d^4 + d)S_{Succ} + d^2 S_{Rej} + (d^2+1)S_{TO} < T \qquad \text{VI.}$$

In order to convert these inequalities into a set of six equations, let $\epsilon$ represent the delta by which the score should be over the threshold value in order to meet the transfer condition for the first three event sequences, and below the threshold value for the last three event sequences. The following equation set may result:

$$(1+d)S_{Dis}^2 = T + \epsilon \qquad \text{I.}$$

$$d^2 S_{Dis} + d S_A + S_{Rej} = T + \epsilon \qquad \text{II.}$$

$$(d^4 + d^2 + d)S_{Rej} + d^2 S_{Succ} + S_{TO} = T + \epsilon \qquad \text{III.}$$

$$d^2 S_{TO} + d^2 S_{Succ} + d S_{Rej} + S_A = T - \epsilon \qquad \text{IV.}$$

$$d^2 S_{Dis} + d S_{Succ} + S_{TO} = T - \epsilon \qquad \text{V.}$$

$$(d^4 + d)S_{Succ} \cdot d^2 S_{Rej} + (d^2+1)S_{TO} = T - \epsilon \qquad \text{VI.}$$

Now, let s be a vector of the to-be-estimated event type weights, i.e:

$$S = \begin{bmatrix} S_{Dis} \\ S_{Succ} \\ S_{Rej} \\ S_A \\ S_{TG} \\ -T \end{bmatrix}.$$

And let $\epsilon$ be a delta vector to reflect the score after a given event sequence to be below or above the threshold:

$$s = \begin{bmatrix} s \\ s \\ s \\ -s \\ -s \\ -s \end{bmatrix}.$$

Then, the set of six equations can be rewritten as a vector equation:

$$F \times s = s.$$

Solving the equation system for the set of weights S provides:

$$s = F^{-1} \times S.$$

As long as the set of example event sequences has been selected so that F became a matrix with full rank and is thus invertible, a simple expression may be used to calculate an estimate of S for a predefined set of event sequence behaviors.

Assuming a discount factor and an offset constant the table 310 illustrated in FIG. 3 provides the estimated parameter set for the solution of the above-noted six example equations. These resulting parameter values reflect the actual results of the user calls. For example, disconfirmations, which tend to have quite a negative impact on caller experience, have the highest weight, whereas the weight for an agent request is much smaller, since such an event is caller initiated and does not necessarily imply a bad example of the caller experience.

It is important to note that weights listed in table 310, are only example results. The values of S depend on the choice of the six constraining equations as well as the default settings for d and $\epsilon$. The algorithm provided here can be seen as a framework to estimate a set of caller event weights that best match the requirements for a specific call processing system, which may be customized by the client and may vary across different clients.

The previous examples discussed how to calculate a set of weight parameters so that a predefined set of example call event sequences will result in the desired call handling dialog management. Once the weight parameters are calculated, it is possible to select a set of caller event weights so that the CEM score calculated at the call end will correlate with a corresponding human rating. This procedure will yield an automated caller satisfaction scoring mechanism.

In order to correlate the CEM scores with human ratings, the continuous floating point CEM score needs to be converted to a discrete number between 1 to 5. Any continuous mapping function can be used for this. In this example, the following mapping function is described below. If a score is below 0, it is assigned a score of 1, if the CEM score is above the threshold, it is assigned a discrete score of 5. If the score is above 0 but smaller than the threshold divided by 3, the assigned discrete value is 2. If the score is above the threshold by 2/3, the assigned score is 3 and lastly if the score is above the threshold by 2/3 but smaller than the threshold the assigned score is 4.

According to example embodiments, let H(c) be the human score for a call (c), with the set of possible scores ranging from 1 to 5. Then, the task of estimating "S" provides finding a "S" that maximizes the correlation between human scoring and automated scoring. Given an initial estimate based on the linear equation system solution noted above, the range may now be varied for each parameter weight type and calculated for the corresponding kappa ($\kappa$) value between the automated rating and the human rating for each parameter set. For the human ratings, the example provider included 100 human ratings and an "aging" discount variable has been set to 0.9.

The dependency of Kappa ($\kappa$) on different caller events depicts the $\kappa$ values describing the correlation between human and automated ratings. When only one parameter has been varied, while the rest have been kept constant, the correlation between human and CEM scores is fairly high, varying in the range of 0.69 to 0.74. A different way of examining the correlation between the machine calculated CEM scores and the human scoring is by measuring which percentage of calls received the same rating between the human rater and the machine and how many calls received a rating that differs only by 1 point.

FIG. 4 illustrates an example table 410, which illustrates the calculated statistics. Each portion of the table represents one parameter set S, the resulting $\kappa$ value and the percentage of an exact agreement between human and machine as well as percentage of agreement differing by 1 and the total agreement which is defined as the sum of exact agreement and agreement with a difference of 1. As can be viewed from the table 410, the exact agreement is in the range of 64-76% and the overall agreement is about just over 90%. For example, for the maximum $\kappa$=0.73, 76.6% of the ratings were identical and for 93.3% of calls the ratings were close to identical in terms of the purpose of automatically scoring a call.

The results in FIG. 4 demonstrate that the correlation between human scores and CEM scores is high, and that the CEM score can be used as an automated rating mechanism in spoken dialog systems in addition to a dialog management method that controls when to transfer a call or to switch the modality. All call processing applications include a trade-off between high caller satisfaction and maximum automation. High caller satisfaction can be represented by a low average CEM score calculated at the call end. High automation can be measured by a minimum number of failed calls, which are defined as calls where the CEM score was above a transfer threshold.

Figure 6:
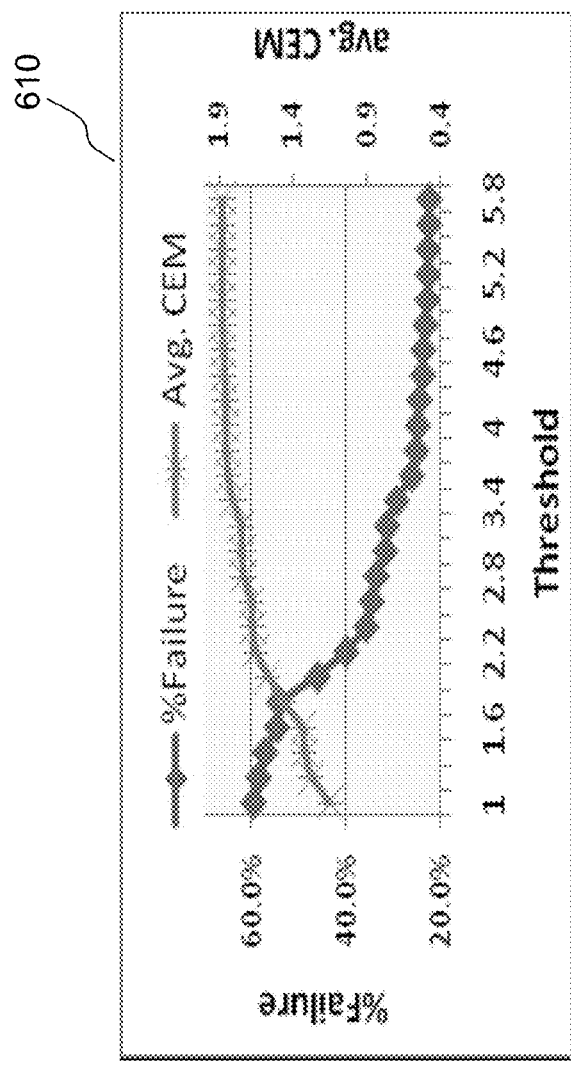
FIG. 6 illustrates a chart of the call failure percentage versus the caller experience metric (CEM) value according to example embodiments of the present invention.

Results for using the CEM metric for both dialog management and measuring caller satisfaction for three different commercial applications will be described below. FIG. 6 illustrates a graph 610 of the relationship between the automation rate, which is the inverse of the call failures and different thresholds for the same application. In this example, with an increasing threshold value, callers spend more time using the application and thus potentially experience more setbacks, which results in an increase of the average CEM score at the call end. At the same time, the failures decrease with an increased threshold. It can be observed that beginning around a threshold of four (4) and above, there is a decrease in failure calls and the increase in CEM values eventually begins to level-off, and thus this would produce an optimal trade-off value between automation and caller satisfaction.

In another example, CEM has been used to determine when to transition from speech as an input modality to touch-tone only as an input modality. In this case, the CEM is being used as a metric to gauge the caller experience throughout the call and if the experience is poor enough (i.e. the metric reaches a predetermined threshold), the application would switch to touchtone as a different modality that makes the interaction increasingly elongated and tedious for a caller. However, this change in modality will minimize the amount of recognition errors and corresponding caller frustration. This example may be particularly helpful in the case when either a caller has a heavy accent or there is a large amount of background noise.

FIG. 5A illustrates an example chart of the impact of using a CEM to switch the modality on the overall system performance. Referring to FIG. 5A, table 510 includes a "without CEM" category of the system performance before the metric is implemented, and the "with CEM" category indicates the performance after the implementation. The CEM metric is used to track the experience of a caller and switch modality if a given threshold was reached. In this example, a 40% decrease in the average number of errors was experienced. Overall, the percentage of calls that ended in a maximum error scenario was reduced by 66%. However, such improvements are made at the cost of a slight decrease in the caller experience since the callers are essentially going to spend a greater amount of time engaged in the call processing system. The impact on the caller experience can be seen from the increase in the average CEM score at the end of the call.

Another example system configuration that has the CEM metric implemented is a user application to start/stop or move one's energy utility service at a home via a call processing application system. In this example, the event weight values were changeable at runtime and high automation rates are typical. As a result, when an initial release, the automation statistics were not large, some of the event weight values had to be adjusted to essentially maintain callers for a greater period of time in the call processing system.

FIG. 5B illustrates a fairly large impact of changing weight values for a commercial user call application. Referring to FIG. 5B, the impact of event weight values changing for an overall automation rate is illustrated. As may be observed from table 520 in FIG. 5B, the application types for a user call include "stop", "start" and "transfer" in an example conducted for a residential energy service. Parameter adjustments may yield improvements in the call success for each application type.

In order to generate caller experience statistics into a call report and to provide the client with statistics as to how many good and/or bad calls there have been, the CEM score value at the end of a call should be converted to a scale between 1 to 5, with 1 being very good and 5 very bad. The conversion formula may include ('Thres' indicating the CEM threshold):

$$CS_{call-end,\ discrete}=1 \text{ if } (CS_{call-end}<0.0)$$

$$CS_{call-end,\ discrete}=2 \text{ if } (0.0<CS_{call-end}<\text{Thres}/3)$$

$$CS_{call-end,\ discrete}=3 \text{ if } (\text{Thres}/3<CS_{call-end}<\text{Thres}/3*2)$$

$$CS_{call-end,\ discrete}=4 \text{ if } (\text{Thres}/3*2<CS_{call-end}<\text{Thres}); \text{ and}$$

$$CS_{call-end,\ discrete}=5 \text{ if } (\text{Thres}<CS_{call-end}).$$

So that the spoken dialog application behavior can be optimized, all parameters that contribute to the caller experience metric may be configurable at run-time. In this example, the threshold variable must be made accessible, and the other variables' accessibility is optional.

According to an example embodiment, a call conducted between an end user and call processing system may end by the caller hanging up their phone or the call processing system hanging up or transferring the caller to a different location. The final CEM score calculated for the call is written into a log file for reporting purposes. As an optional operation, the continuous score can be converted to an integer number on a scale of 1 to 5 with any kind of mapping rule from continuous, floating point numbers to integers. For example, the minimum and maximum range for an observed score may be used for a limited time frame and the range may be divided between the minimum and maximum into five equally large sections. Then a score that falls into the smallest sections is mapped to 1. The subsequent sections are mapped to 2-5 to provide a numerical score between 1 and 5.

Once the continuous score has been mapped to an integer this number can also be logged and reported. This provides a metric that measures the caller experience over many calls and over a given time frame, such a procedure may be used to generate a trending pattern of an application over time or in order to identify problem calls by referencing calls that received the worst rating(s).

A Javascript subroutine retrieves value sets in the call application's runtime configuration portal. As shown above, the portal includes pre-configured values that can be accessed from within the Javascript. It is invoked from the call application as the call progresses and passes through traceable states such as the "timeout", "rejection", "successful recognition", "disconfirmation", and "agent request" states.

In this Javascript example, global variables are created to customize the spoken dialog application. For example, "CEM score", is a variable that is incremented and decremented in the Javascript as the caller progresses through the speech application. Global variables are created using concept topics. In the example script shown below, a CEM score "CTGlobalErrCounter" was set and initialized to zero.

Another global variable may be "too many errors", which represents a "true" value when the CEM score overshoots the threshold value. The call application tracks this variable and when it is "true", the caller is typically transferred to a representative. For example, a variable of "CTTooManyErrors" was set and initialized to "false."

Next, access to the values set in the runtime configuration must be provided. For example: 1) Setback for rejection—CTSetbackNM, 2) Setback for timeout—CTSetbackNI, 3) Setback for Agent Request—CTSetbackAgent, 4) Setback for recognition success—CTSetbackSuc, 5) Setback for Disconfirmation—CTSetbackDis, 6) Setback for Discounting Variable—CTDiscount, 7) Setback for Error Count Threshold—CTErrCntThreshold.

An example program in accordance with example embodiments is included below. Program beginning:

```
//==================================================
        // UpdateGlobalErrCounter
        // Description: Used to increment the Global Error Counter
        // Usage: UpdateGlobalErrCounter('timeout')
        //==================================================
        function UpdateGlobalErrCounter(setback) {var result = application.gConceptMemory.CTGlobalErrCounter;
            var numSetback = 0;
            if (setback == 'rejection' ) {numSetback = application.gConceptMemory.CTSetbackNM;}
            else if (setback == 'timeout' ) {numSetback = application.gConceptMemory.CTSetbackNI;}
            else if (setback == 'agent' ) {numSetback = application.gConceptMemory.CTSetbackAgent;}
            else if (setback == 'success' ) {numSetback = application.gConceptMemory.CTSetbackSuc;}
            else if (setback == 'disconfirm' ) {numSetback = application.gConceptMemory.CTSetbackDis;} var discount = application.gConceptMemory.CTDiscount; result = discount * result + numSetback; var threshold = application.gConceptMemory.CTErrCntThreshold;
            if (result > threshold) {
application.gConceptMemory.CTTooManyErrors = 'true';}
            if (result < 0) {result = 0;}
application.gConceptMemory.CTGlobalErrCounter = result;
            return result;}
```

The operations of a method or algorithm described in connection with the embodiments disclosed herein may be embodied directly in hardware, in a computer program, or a non-transitory computer readable storage medium and executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of a non-transitory storage medium known in the art.

An exemplary storage medium may be coupled to the processor such that the processor may read information from, and write information to the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may embody and operated in accordance with the above-noted example embodiments.

Figure 7:
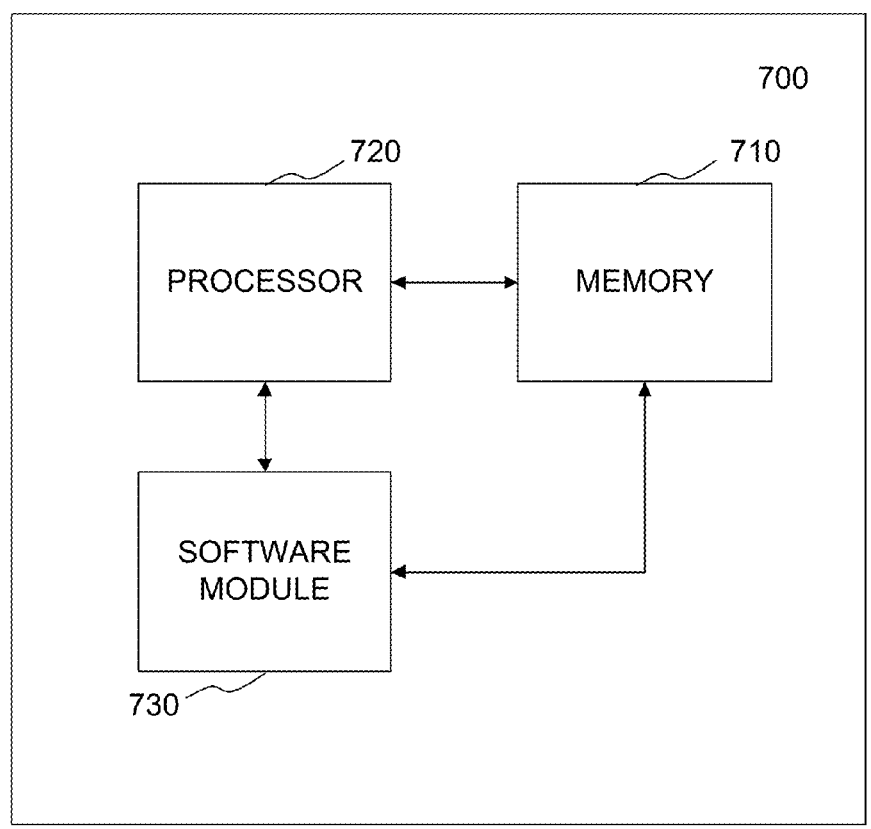
FIG. 7 illustrates an example network entity that may include memory, software code and other computer processing hardware configured to perform to operate in accordance with the example embodiments.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

Figure 8:
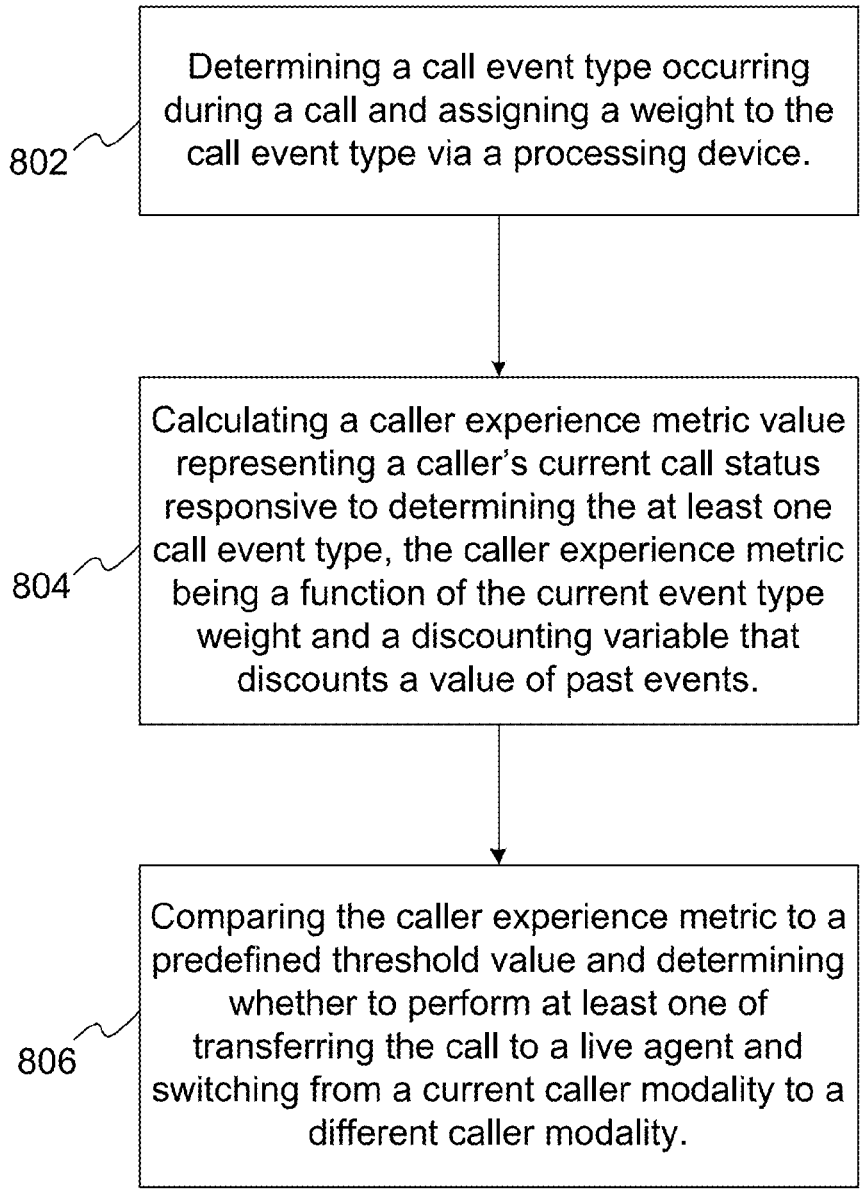
FIG. 8 illustrates an example flow diagram of a method of operation according to example embodiments of the present invention.

One example embodiment of the present invention may include a method of operations as illustrated in FIG. 8. Referring to FIG. 8, the method may include determining a call event type occurring during a call and assigning a weight to the call event type via a processing device, at operation 802. The method may also include calculating a caller experience metric value representing a caller's current call status responsive to determining the at least one call event type, the caller experience metric being a function of the current event type weight and a discounting variable that discounts a value of past events, at operation 804. The method may also include comparing the caller experience metric to a predefined threshold value and determining whether to perform at least one of transferring the call to a live agent and switching from a current caller modality to a different caller modality, at operation 806.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   determining a call event type occurring at a turn during a call and assigning a weight to the call event type via a processing device;
   calculating a caller experience metric value representing a caller's current call status responsive to determining the at least one call event type, the caller experience metric being a function of the current event type weight, past events at past turns of the call and a discounting variable that discounts a value of past events at past turns of the call; and
   comparing the caller experience metric to a predefined threshold value and determining whether to perform at least one of transferring the call to a live agent and switching from a current caller modality to a different caller modality.

2. The method of claim 1, wherein the call event type comprises a recognized utterance spoken by the caller during the call.

3. The method of claim 1, wherein the call event type comprises an unrecognized utterance spoken by the caller during the call.

4. The method of claim 1, wherein the call event type comprises a timeout error due to a failure to recognize, via the processing device, dialog spoken by the caller.

5. The method of claim 1, wherein the call event type comprises a disconfirmation by the caller confirming that an utterance spoken by the caller was interpreted incorrectly.

6. The method of claim 1, wherein the call event type comprises a request by the caller to speak with a live agent.

7. The method of claim 1, wherein the at least one of transferring the call to the live agent and switching from the current caller modality to the different caller modality is performed if the caller experience metric is greater than the predefined threshold value.

8. An apparatus, comprising:
   a transmitter; and
   a processor configured to
      determine a call event type occurring during a call and assign a weight to the call event type;
      calculate a caller experience metric value representing a caller's current call status responsive to determining the at least one call event type, the caller experience metric being a function of the current event type weight, past events at past turns of the call and a discounting variable that discounts a value of past events at past turns of the call; and
      compare the caller experience metric to a predefined threshold value and determine whether to perform at least one of transferring the call, via the transmitter, to a live agent and switch from a current caller modality to a different caller modality.

9. The apparatus of claim 8, wherein the call event type comprises a recognized utterance spoken by the caller during the call.

10. The apparatus of claim 8, wherein the call event type comprises an unrecognized utterance spoken by the caller during the call.

11. The apparatus of claim 8, wherein the call event type comprises a timeout error due to a failure to recognize, via the processor, dialog spoken by the caller.

12. The apparatus of claim 8, wherein the call event type comprises a disconfirmation by the caller confirming that an utterance spoken by the caller was interpreted incorrectly.

13. The apparatus of claim 8, wherein the call event type comprises a request by the caller to speak with a live agent.

14. The apparatus of claim 8, wherein the at least one of transfer the call to the live agent and switch from the current caller modality to the different caller modality is performed if the caller experience metric is greater than the predefined threshold value.

15. A non-transitory computer readable storage medium configured to store instructions that when executed cause a processor to perform:
   determining a call event type occurring during a call and assigning a weight to the call event type via a processing device;
   calculating a caller experience metric value representing a caller's current call status responsive to determining the at least one call event type, the caller experience metric being a function of the current event type weight, past events at past turns of the call and a discounting variable that discounts a value of past events at past turns of the call; and
   comparing the caller experience metric to a predefined threshold value and determining whether to perform at least one of transferring the call to a live agent and switching from a current caller modality to a different caller modality.

16. The non-transitory computer readable storage medium of claim 15, wherein the call event type comprises a recognized utterance spoken by the caller during the call.

17. The non-transitory computer readable storage medium of claim 15, wherein the call event type comprises an unrecognized utterance spoken by the caller during the call.

18. The non-transitory computer readable storage medium of claim 15, wherein the call event type comprises a timeout error due to a failure to recognize, via the processing device, dialog spoken by the caller.

19. The non-transitory computer readable storage medium of claim 15, wherein the call event type comprises a disconfirmation by the caller confirming that an utterance spoken by the caller was interpreted incorrectly.

20. The non-transitory computer readable storage medium of claim 15, wherein the call event type comprises a request by the caller to speak with a live agent.

* * * * *